United States Patent
Bernadet et al.

(10) Patent No.: US 11,679,858 B2
(45) Date of Patent: Jun. 20, 2023

(54) AIRCRAFT PART COMPRISING AN INTERNAL MODULE WITH IMPROVED ATTACHMENT

(71) Applicant: AIRBUS OPERATIONS (S.A.S.), Toulouse (FR)

(72) Inventors: Philippe Bernadet, Toulouse (FR); Benoit Courouble, Blagnac (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 385 days.

(21) Appl. No.: 16/912,195

(22) Filed: Jun. 25, 2020

(65) Prior Publication Data
US 2020/0407035 A1 Dec. 31, 2020

(30) Foreign Application Priority Data
Jun. 26, 2019 (FR) ..................... 1906980

(51) Int. Cl.
*B64C 1/06* (2006.01)
*B64C 1/12* (2006.01)
*B64F 5/10* (2017.01)

(52) U.S. Cl.
CPC .............. *B64C 1/061* (2013.01); *B64C 1/068* (2013.01); *B64C 1/069* (2013.01); *B64C 1/0683* (2020.01); *B64C 1/12* (2013.01); *B64F 5/10* (2017.01)

(58) Field of Classification Search
CPC ......... B64C 1/12; B64C 1/069; B64C 1/0683; B64C 1/068
See application file for complete search history.

(56) References Cited

U.S. PATENT DOCUMENTS

| 5,014,934 A | * | 5/1991 | McClaflin | ............. F16B 21/078 244/129.4 |
| 2019/0162225 A1 | * | 5/2019 | Etling | ..................... F16B 37/14 |

FOREIGN PATENT DOCUMENTS

| EP | 2 598 398 | 6/2013 |
| WO | 2012/022891 | 2/2012 |

OTHER PUBLICATIONS

French Search Report and Written Opinion of French Application No. 1906980 dated Apr. 20, 2020, 9 pages.

* cited by examiner

*Primary Examiner* — Timothy D Collins
*Assistant Examiner* — Terri L Filosi
(74) *Attorney, Agent, or Firm* — Nixon & Vanderhye P.C.

(57) ABSTRACT

A method and apparatus for facilitating the attachment of an internal module in an internal space of an aircraft part is disclosed. The attachment device includes at least one attachment member comprising an attachment shank, a chamber for introducing the attachment member, the chamber including a first orifice through which the attachment shank passes in the installed configuration of the internal module, and a second orifice which serves for the introduction of the attachment member into the chamber from the outside.

14 Claims, 10 Drawing Sheets

AIRCRAFT PART COMPRISING AN INTERNAL MODULE WITH IMPROVED ATTACHMENT

CROSS REFERENCE TO RELATED APPLICATION

This application claims priority to and incorporates by reference French Patent Application Number 1906980, filed Jun. 26, 2019.

BACKGROUND

1. Field of the Invention

The disclosure generally relates to the field of the assembly of the various components of an aircraft, and more specifically, to the attachment of an internal module in a limited-accessibility environment. The disclosure also relates to any type of module, for example, a simple and compact module, or to a more voluminous module incorporating a number of functionalities.

2. Description of the Related Art

In order to reduce the assembly time for the various components of an aircraft, these can be grouped together beforehand into a single module, which is intended to be subsequently installed on the structure of the aircraft.

However, the greater the number of components incorporated into the module, the more complicated it can be to attach said module to the fuselage. This difficulty is explained by the large size of the module, which sometimes allows only limited access for the operators attaching this module to the internal part of the fuselage.

This drawback is all the greater when a nosecone of the aircraft is involved, on account of the narrowing of the cross section of the fuselage towards the nose.

A similar problem also exists for modules of smaller size, since they need to be attached in a packed environment, presenting difficulties in terms of access for the operators.

SUMMARY

The internal space intended to receive the module may be a pressurized space delimited by the fuselage of the aircraft, in the main section or in the nosecone. However, it can also be a non-pressurized space, may likewise be delimited by an external aerodynamic surface of the aircraft, such as a landing gear bay, or internal spaces defined beyond the sealed bulkheads, such as the front region known as the "radome" region.

The invention encompasses an aircraft part comprising an internal module and a skin provided with at least one stiffener, the module being arranged in an internal space of the aircraft part and installed in this internal space with the aid of at least one attachment device, the latter comprising:
  at least one attachment member comprising an attachment shank and may include a bearing head;
  a chamber for introducing the attachment member from the outside of said internal space, the chamber comprising a first orifice through which the attachment shank passes in the installed configuration of the internal module, and a second orifice which serves for the introduction of the attachment member into the chamber from the outside of the internal space.

Therefore, the present disclosure breaks with the prior techniques for attaching an internal module from the internal space in which it is located, since the design proposed makes it possible advantageously to attach the module from the outside. This capacity is made possible by the addition of a chamber for introducing the attachment member, which allows access to the internal space from the outside.

Operators therefore have easier access to the attachment device for the internal module, irrespective of the size of the module to be installed and the density of the modules to be installed in the zone.

The disclosure may provide at least one of the following optional features, taken in isolation or in combination.

The attachment device comprises a hollow post forming the introduction chamber, an internal longitudinal end of the post forming a bearing support for the internal module and being passed through by the first orifice, and an external longitudinal end of the post being attached to the skin. In addition, the second orifice may be an orifice made through the skin, or an orifice made through the external longitudinal end of the post, when this end is itself housed in an orifice in the skin.

The post is arranged between two immediately consecutive stiffeners of the skin, and the post is attached to at least one of the two stiffeners by way of one or more attachment walls.

The one or more attachment walls may comprise at least one longitudinal member attached at its two opposite longitudinal ends to the two immediately consecutive stiffeners.

The one or more attachment walls may delimit with the skin and the two stiffeners a box structure internally delimiting an enclosure containing at least a part of the post.

The enclosure is pressurized, and the attachment device comprises a pressure sealing system arranged between the internal longitudinal end of the post and the internal module. Alternatively or at the same time, the attachment device comprises a pressure sealing system arranged in the region of the closure member.

The closure member is mounted by screwing, clip-fastening, or by a quarter-turn connection, or by another removable connecting technique known to a person skilled in the art.

The attachment device also comprises, mounted on the internal module, a complementary attachment member cooperating with the attachment shank of the attachment member.

The attachment member is a screw, and the complementary attachment member is a nut, and may be a floating nut or a barrel nut.

The attachment device comprises an indicator element for correct mounting of the attachment member, the indicator element may be configured to be pushed by the attachment member while it is being mounted.

The disclosure also encompasses an aircraft comprising such an aircraft part, which may be a nosecone of this aircraft.

The disclosure also encompasses a method for assembling an internal module of such an aircraft part, comprising the following steps of:
  transferring the module into the internal space;
  introducing the attachment member into the introduction chamber through the second orifice from the outside; and
  mounting the attachment member by introducing the attachment shank through the first orifice.

Further advantages and features of the invention will become apparent from the following non-limiting detailed description.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale, emphasis instead being placed upon illustrating particular principles, discussed below.

DETAILED DESCRIPTION OF SOME EMBODIMENTS

Some embodiments will now be described with reference to the Figures.

Figure 1:
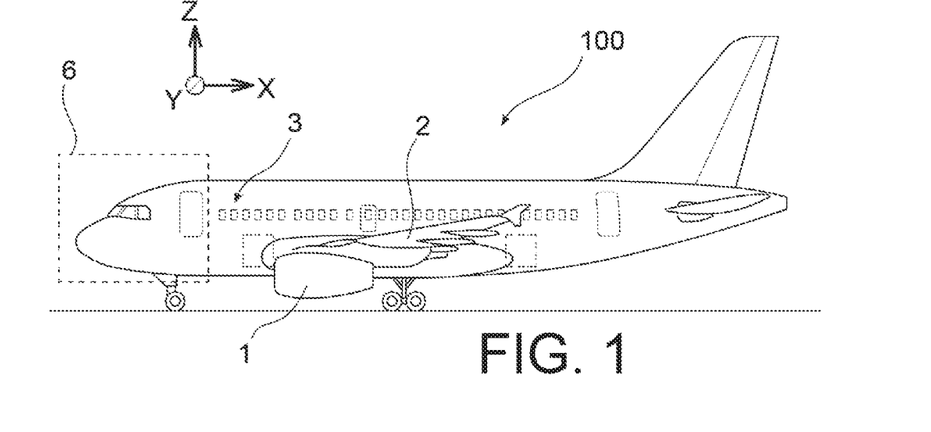
FIG. 1 a plan side view of an aircraft.

Referring now to FIG. 1, an aircraft 100 of the commercial aircraft type is shown including two wings 2 (only one of which is visible in FIG. 1) secured to a fuselage 3, and each supporting a turbomachine 1 of the turbofan type, such as a jet engine.

Provided on this aircraft 100 is a nosecone 6 specific to the invention, which will be described below. However, the invention can also apply to other parts of the aircraft. In particular, it may be any other aircraft part such as the ones mentioned above, namely for example an aircraft part incorporating a landing gear bay, or an internal space delimited by a sealed bulkhead, or a pressurized internal space delimited by a main section of the fuselage, as opposed to the nosecone, which narrows in the longitudinal direction.

Figure 2:
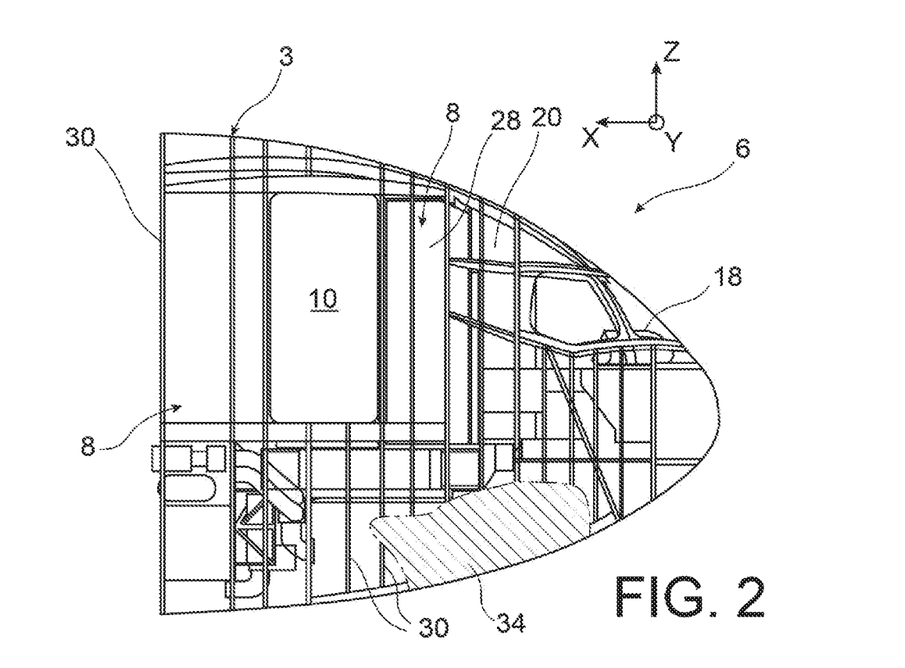
FIG. 2 is a schematic side view of the nosecone of the aircraft shown in FIG. 1.
Figure 3:
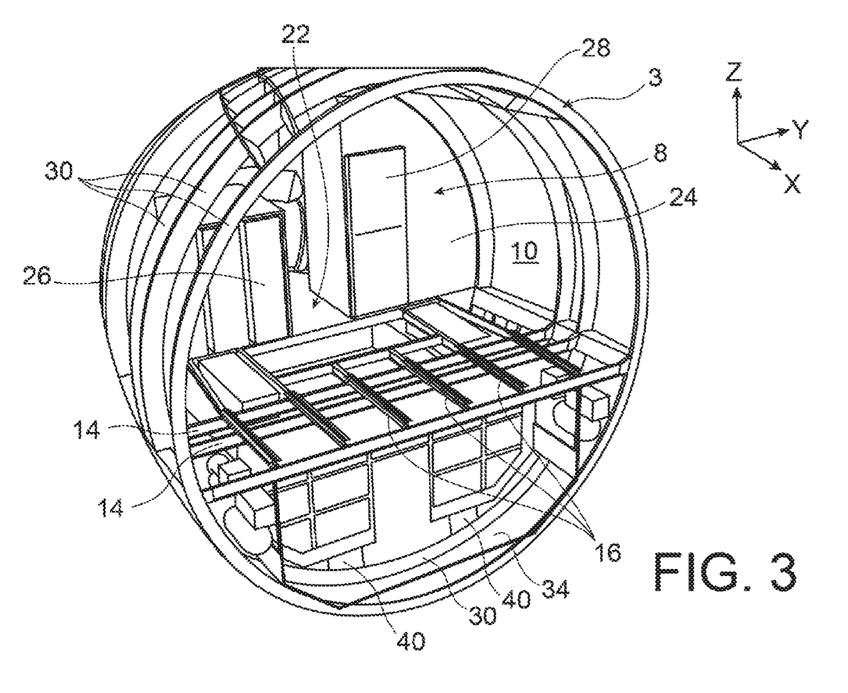
FIG. 3 is a perspective view of the aircraft nosecone shown in FIG. 2.

FIGS. 2 and 3 show a part of the nosecone 6, as obtained by simply assembling a nosecone internal module 8 in an internal space 10 defined by the fuselage 3 of the nosecone, also known as the "nosecone framework". By virtue of the very self-contained nature of the internal module, also known as an "integral module", this simple assembly results in a substantially finished nosecone 6. In other words, the assembly of the module 8 on the fuselage 3 brings about a nosecone that requires very few subsequent operations in order to result in a finalized version, ready to be assembled with the other portions of the aircraft.

Throughout the following description, by convention, the direction X corresponds to the longitudinal direction of the aircraft, this direction also corresponding to the longitudinal/axial direction of the nosecone 6, and to the longitudinal/axial direction of the module 8 thereof and the fuselage 3 thereof. Moreover, the direction Y corresponds to the lateral or transverse direction of the aircraft, this direction also corresponding to the lateral direction of the nosecone 6, and to the module 8 thereof and the fuselage 3 thereof. Finally, the direction Z corresponds to the vertical or height direction, these three directions X, Y and Z being mutually orthogonal.

Figure 4:
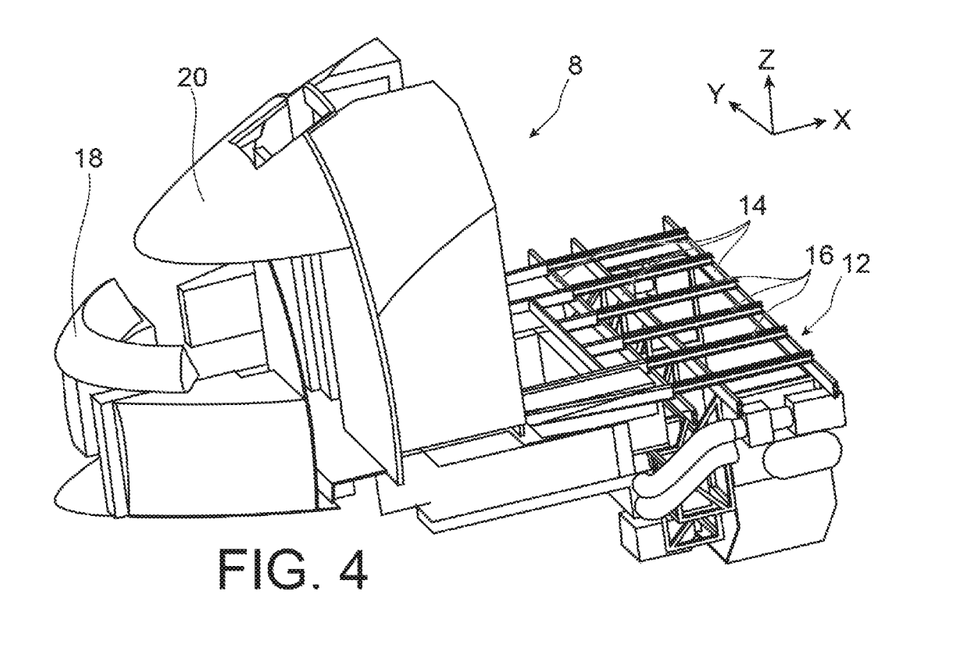
FIG. 4 is a perspective view of the module equipping the nosecone shown in FIGS. 2 and 3.
Figure 5:
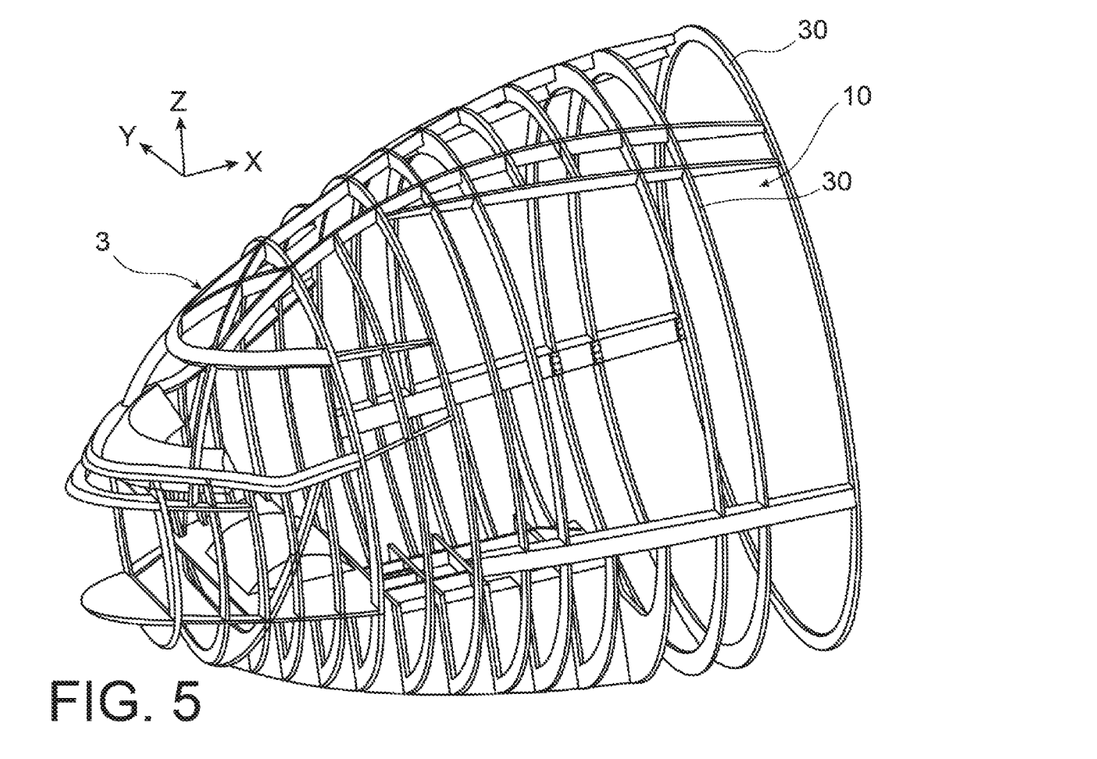
FIG. 5 is a perspective view of the fuselage of the nosecone shown in FIGS. 2 and 3 and intended to receive the internal module shown in FIG. 4.

The module 8 can be self-contained, incorporating several components of the nosecone 6. In this case, the internal module 8, which is visible in FIGS. 2 to 4, comprises one or more sub-modules selected from those listed below, and may comprise all of these sub-modules:

- a floor 12 comprising a plurality of transverse members 14 parallel to the direction Y.

The transverse members 14 are connected together by longitudinal members 16 parallel to the direction X;

- at least one system 18, for example of the navigation system or equipment type;
- at least one cockpit lining 20;
- at least one door system 22;
- at least one bulkhead 24;
- at least one onboard galley 26;
- at least one toilet cubicle 28.

These sub-modules may incorporate final linings and panels, thereby avoiding the need to assemble them after the module 8 has been installed in the fuselage 3. By way of example, all of these components/sub-modules are incorporated in an internal module 8, optionally in combination with yet other components, or optionally without the onboard galley and the toilet cubicle. The internal module 8 thus proves to be multifunctional by incorporating a large number of elements that are assembled with one another, before this module 8 is fitted and assembled in the internal space 10 defined by the fuselage 3 of the nosecone, visible in FIGS. 2 to 5.

Figure 2A:
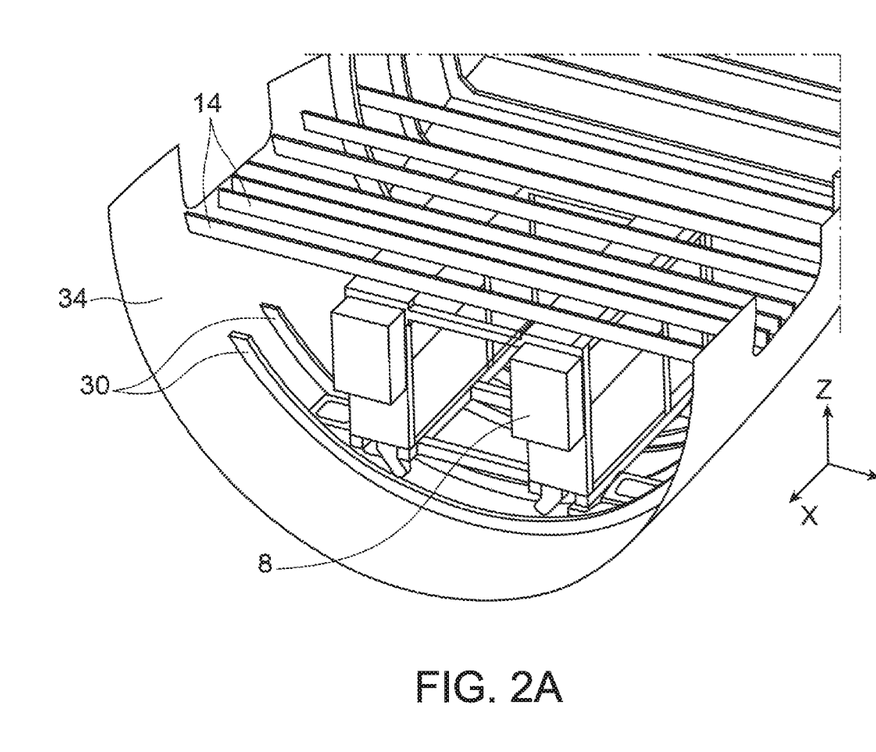
FIG. 2A is a schematic perspective view of the nosecone of the aircraft shown in FIG. 1, with the nosecone according to an exemplary embodiment.

However, as indicated above, the module 8 could have a much more simple design without departing from the scope of the invention. By way of example, it could be a simple system block 8 with its load-bearing structure positioned and fixed in the avionics bay, as is schematically depicted in FIG. 2A.

The fuselage 3, which corresponds to a front portion of the fuselage of the aircraft, has a conventional design with the overall shape of an ogive, the dimensions in the directions Y and Z narrow towards the front in the direction X. The fuselage 3 defines a structural envelope, the void of which corresponds to the internal space 10 receiving the internal module 8. For the production of this fuselage, stiffeners, in this case fuselage frames 30 that are spaced apart from one another in the direction X and are inscribed in planes YZ, are provided.

The frames 30 extend all around the envelope, with a shape similar to the local shape of the fuselage. The latter also comprises a skin 34, known as the fuselage external skin or aerodynamic skin. The frames 30 are attached to the internal surface of the fuselage skin 34, in a manner known to a person skilled in the art. Other designs remain possible, however, in which the stiffeners 30 are incorporated directly in the skin so as to form what is known as a "stiffened" skin. Below, the stiffeners 30 will therefore be considered, by way of example, to be fuselage frames.

Figure 6:
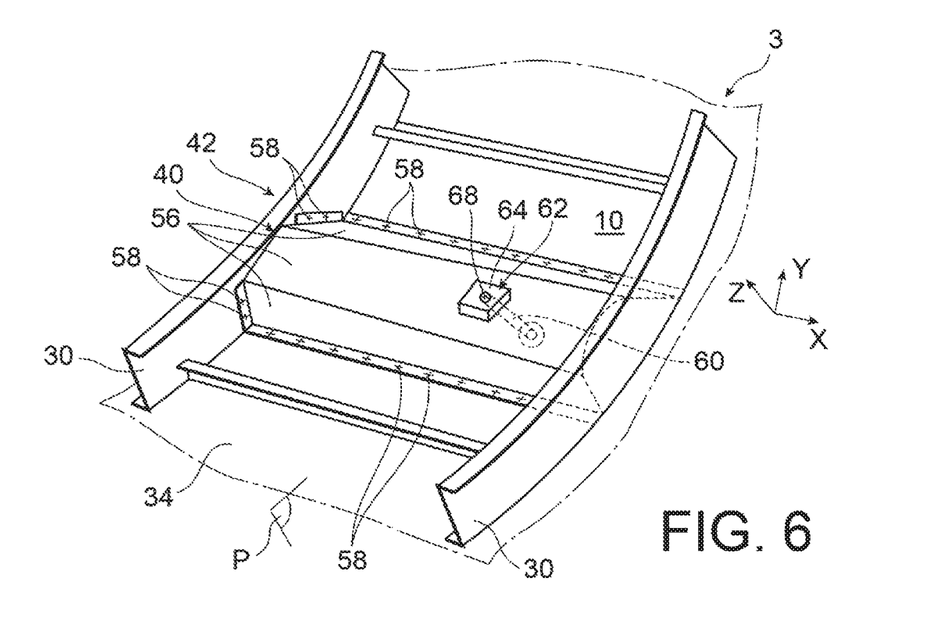
FIG. 6 is a perspective view of an attachment device for the internal module according to an exemplary embodiment.
Figure 7:
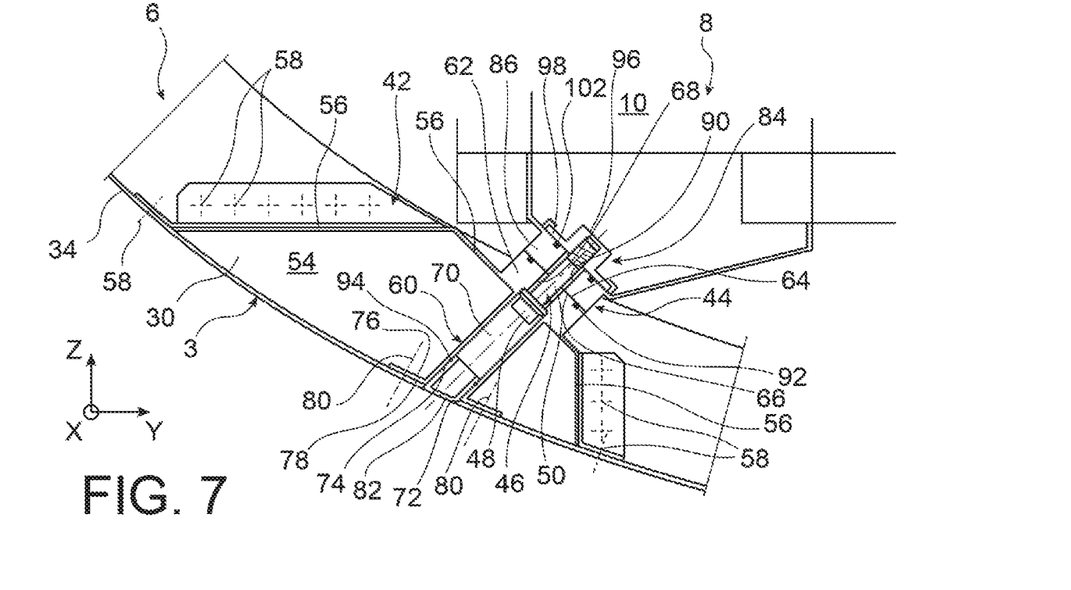
FIG. 7 is cross section of the attachment device along the transverse plane "P" in FIG. 6.

The internal module 8 can be installed at several points on the fuselage 3, for example on one or more fuselage frames 30. Other attachments can also be envisaged, however, such as the attachment of the internal module 8 to the fuselage frames 30 in the region of the roof of a front landing gear bay. Other sub-modules can also be directly attached to the frames 30, such as cockpit sub-modules. However, one of the particular features of the invention resides in the employment of one or more attachment devices 40 for attaching the internal module 8 from the outside of the fuselage 3. These attachment devices 40, shown schematically in FIG. 3, are for example fitted between a lower portion of the fuselage 3 and a lower part of the module 8. They can be employed singly or in combination with the other attachments of the module that are described below. FIGS. 6 and 7 show one of the attachment devices 40 according to an exemplary embodiment of the invention.

First of all, the attachment device 40 comprises a first part 42 incorporated in the fuselage, a second part 44 incorporated in the module 8, and an attachment member 46 connecting these two parts. The attachment member 46 may be a screw and may comprise a bearing head 48 and an attachment shank 50, this shank being integral with the bearing head 48 and threaded at least at its distal end. However, other types of attachment member can be used instead of the screw without departing from the scope of the invention. By way of example, the attachment member 46 could not have a bearing head, while providing a design that makes it possible to axially retain this member using some other means.

The first part 42 of the attachment device 40 comprises an enclosure 54 delimited by a box structure formed by the skin 34, the two immediately consecutive frames 30, and attachment walls 56. For example, three attachment walls 56, in the form of longitudinal members connected laterally together, are provided. These three walls 56 may be separate elements that are connected fixedly together, for example by welding, screwing or any other conventional technique, or they can be formed using a single plate having folds. At the opposite longitudinal ends of each of these walls 56, the latter are attached to two fuselage frames 30 that are immediately consecutive in the direction X, for example by way of conventional attachment means of the bolt and/or rivet type 58.

The two opposite longitudinal edges of the assembly formed by the three walls 56 are for their part attached to the fuselage skin 34, likewise by way of conventional attachment means of the bolt and/or rivet type 58.

The enclosure 54 is also delimited by the skin 34 situated between the two abovementioned fuselage frames 30, and by these same two frames 30. The "box" structure thus obtained provides satisfactory mechanical integrity at lower cost. This box structure corresponds to a modification of the internal structure of the aircraft, intended to at least partially house a hollow post 60 in its enclosure 54.

The post 60 has an internal longitudinal end 62 that opens out in a central region of the assembly formed by the three attachment walls 56. The internal longitudinal end 62 can pass in a sealed manner through the central attachment wall 56, or be formed in one piece therewith. Its internal end surface forms a bearing support 64 for a complementary bearing support 66 provided on the internal module 8. In the installed configuration of the internal module as shown in FIG. 7, the interface between the two bearing supports 64, 66 may be planar.

Through the internal longitudinal end 62 there passes a first orifice 68 that opens out at the bearing support 64 on one side and opens out on the other side in a chamber 70 for introducing the screw 46 from the outside of the fuselage. This introduction chamber 70 is defined by the hollow part of the post 60. It is continued towards the outside by a second orifice 72 made through the skin 34. This second orifice 72 is situated in line with a corresponding orifice 74 at the external end of the introduction chamber 70. This orifice 74 is thus made through an external longitudinal end 76 of the post 60, incorporating a post 78 assembled fixedly on the internal surface of the skin 34, around the second orifice 72. The post 78 is attached to the skin 34 using conventional attachment means 80 such as rivets.

The post 60, which is thus held fixedly by the abovementioned box structure and arranged between the two frames 30 in the enclosure 54, thus makes it possible, with the second orifice 72 in the skin 34, to allow the screw 46 to be introduced from the outside of the fuselage. This arrangement allows better access for the operator. However, in order to limit the aerodynamic disturbances associated with this orifice 72 in the skin 34, this orifice may be closed off by a closure member 82 mounted removably on the post 60.

More specifically, the closure member 82 in the form of a stopper comprises an aerodynamic external part that reconstitutes the skin at the second orifice 72 such that this external part is flush with this same skin 34. The closure member 82 also comprises an internal attachment part, which passes through the external longitudinal end 76 of the post 60 and is housed in the introduction chamber 70. This internal part of the closure member 82 allows it to be attached to the fuselage 3, for example by being screwed to the threaded internal surface of the post 60 delimiting the chamber 70. Other attachment techniques remain possible, however, such as clip-fastening, or attachment by a quarter-turn connection.

The second part 44 of the attachment device 40, which is incorporated in the internal module 8, for its part comprises not just the complementary bearing support 66 but also a complementary attachment member 84. This is a nut 84, mounted in a fixed or floating manner on a mounting plate 86 of the module 8 defining the complementary bearing support 66. A barrel-nut solution is also possible, in which this nut 84 is then embedded in the mounting plate 86 of the module.

In the installed configuration of the internal module 8, the nut 84 engages with the attachment shank 50 of the screw 46. In this configuration, which is shown in FIG. 7, the bearing head 48 of the screw is housed in the introduction chamber 70, in abutment against a shoulder of the internal longitudinal end 62 of the post 60. This shoulder opens onto the first orifice 68, through which the attachment shank 50 of the screw 46 passes, this shank also passing through a through-orifice 90 made through the mounting plate 86 of the internal module 8. At the outlet of this through-orifice 90, the threaded part of the attachment shank 50 is screwed into the nut 84, thereby exerting a pressing force at the interface between the two bearing supports 64, 66. It is at this same interface that a pressure sealing system 92 is arranged, for example in the form of a seal squashed between these two supports 64, 66. In this case, the enclosure 54 defined by the box structure may remain pressurized, apart from the introduction chamber 70 defined by the post 60, which for its part may remain non-pressurized. Alternatively or at the same time, a pressure sealing system 94 can be positioned between the closure member 82 and the post 60. Finally, it is noted that the nut 84 can have a cap 96 and a flange 98 squashing a liquid- and airtight seal 102 against the mounting plate 86 so as to enclose the attachment shank 50 of the screw 46 in a protected atmosphere.

Figure 8:
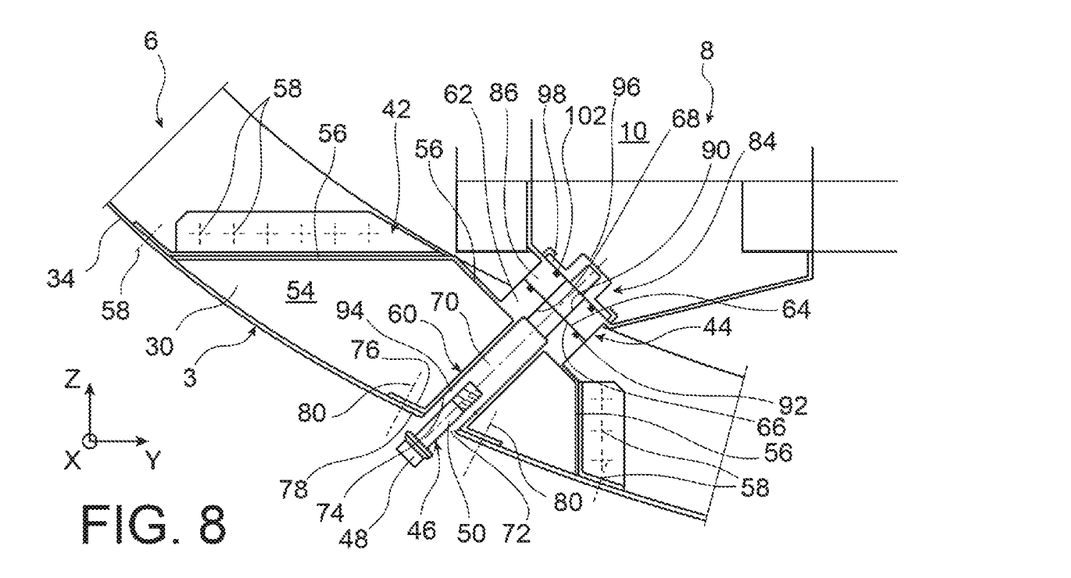
FIG. 8 is a transverse cross section of the attachment device during a step of attaching the module.
Figure 9:
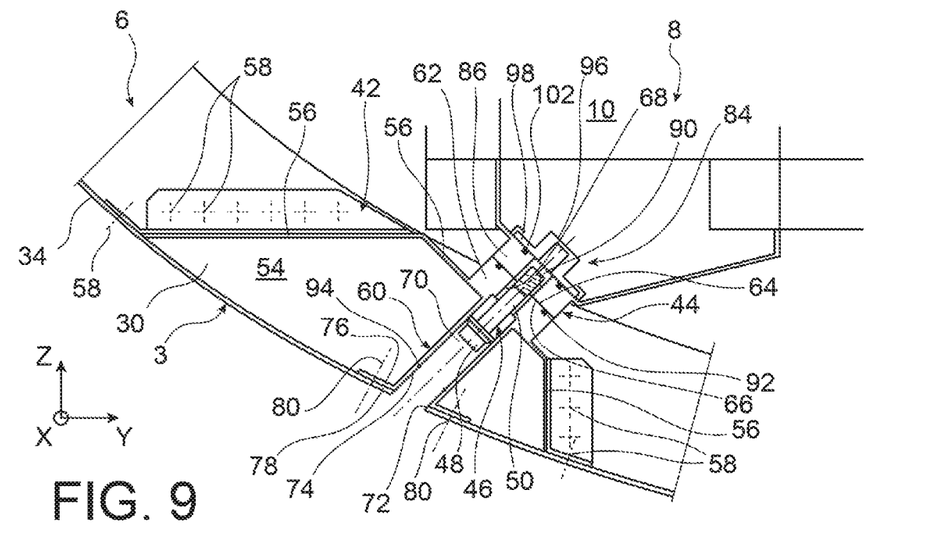
FIG. 9 is a transverse cross section of the attachment device still in the course of a step of attaching the module.

Referring now to FIGS. 8 and 9, a method for assembling the internal module 8, and in particular the attachment thereof to the fuselage 3 with the aid of the attachment device 40, will be described.

The method first of all starts with the transfer of the module 8 into the internal space 10 of the fuselage, in its final position or close to this final position. These causes the two bearing supports 64, 66 to engage and the two passage orifices 68, 90 to be aligned. On the external side of the fuselage, the operator introduces the screw 46 axially into the chamber 70 via the second orifice 72, which has been freed of its closure member beforehand. This operation is schematically depicted in FIG. 8.

Next, the screw 46 continues to be moved inwards in the introduction chamber 70 until its attachment shank 50 comes into contact with the nut 84, after having passed through the two through-orifices 68, 90. Such a position is schematically depicted in FIG. 9. From this moment, the screw 46 is screwed into the nut 84 with the aid a tool (not shown), which is likewise introduced into the chamber 70 from the outside through the second orifice 72, until the required clamping force is obtained. The module 8 is then in the configured installed on the fuselage 3.

The second orifice 72 is then closed off with the closure member, which is screwed onto the post 60. It is noted that the internal module 8 can be assembled using several attachment devices 40 like the one that has just been presented. These devices 40 can be arranged between the two same fuselage frames 30 or be distributed in different inter-frame spaces. In addition, an attachment device 40 can comprise a single post 60 associated with a screw 46, or comprise a plurality of posts 60 arranged in the enclosure 54 of one and the same device 40, with each of these posts 60 being associated with a separate screw 46.

Figure 10:
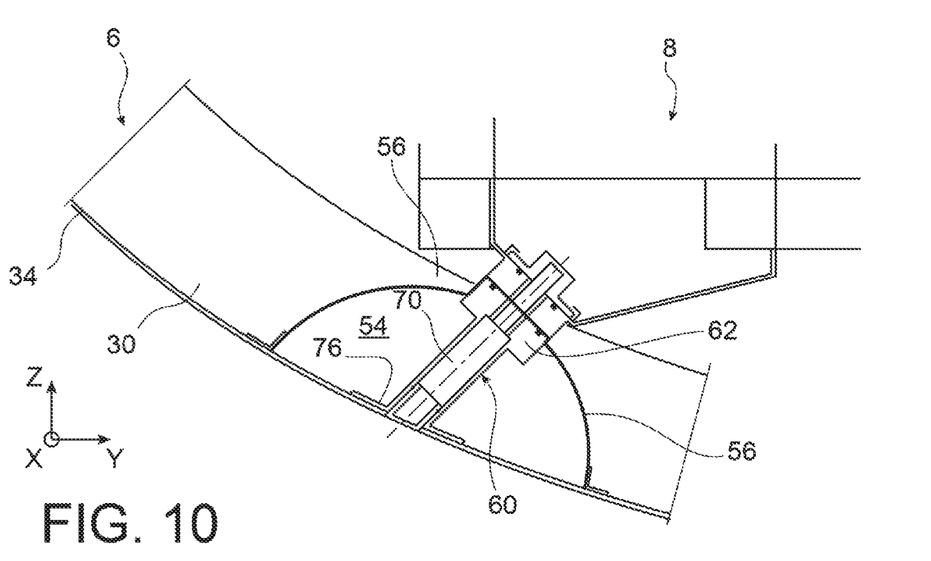
FIG. 10 is a transverse cross section of an attachment device for an internal module according to an exemplary embodiment.

According to a second embodiment, which is shown in part in FIG. 10, the three attachment walls are replaced with a single attachment wall 56 of domed shape, the latter being attached to the same fuselage elements as in the first embodiment. The single attachment wall 56 can adopt a cylindrical shape, for example with a cross section in the shape of a circular arc.

Figure 11:
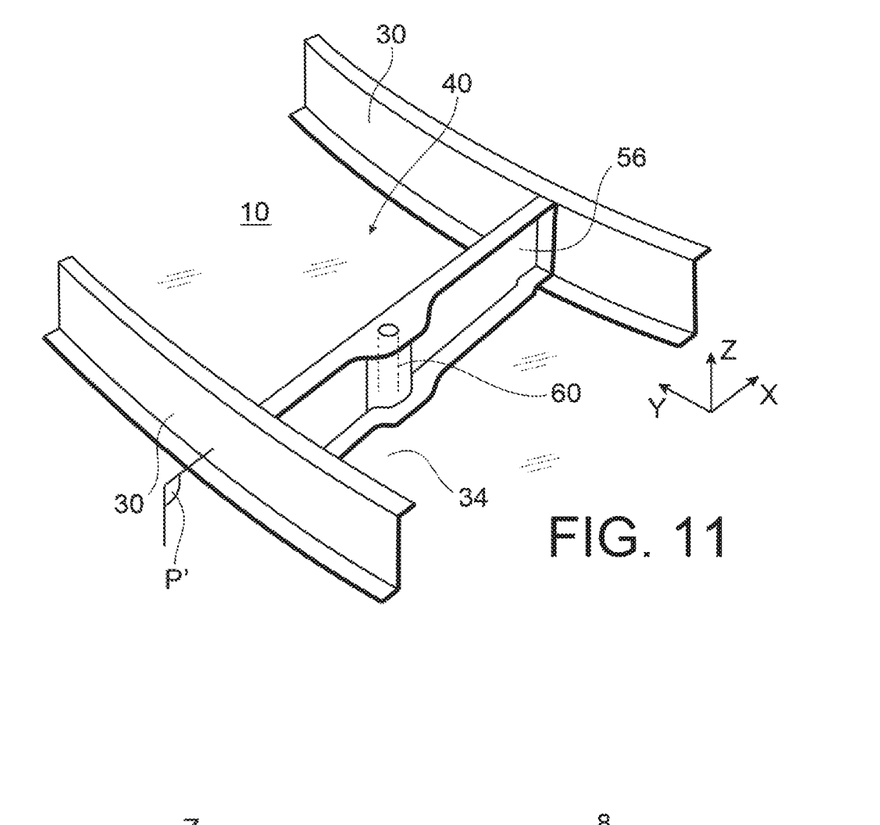
FIG. 11 is a perspective view of a part of an attachment device for an internal module according to an exemplary embodiment.
Figure 12:
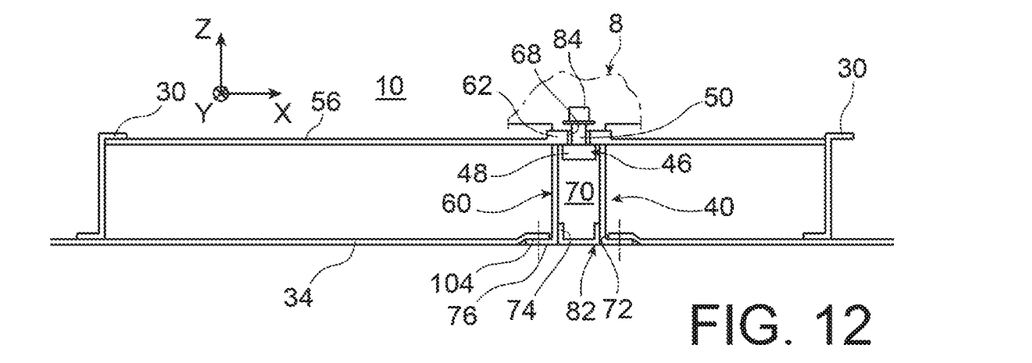
FIG. 12 is a cross section of the attachment device along the transverse plane "P" in FIG. 11.

FIGS. 11 and 12 show the attachment device 40 according to another exemplary embodiment of the invention. One of the particular features of this third embodiment resides in the fact that the hollow post 60 is incorporated in an overthickness of the core of a single attachment wall 56 in the form of a longitudinal member, the two opposite longitudinal ends of which are still attached respectively to the two immediately consecutive fuselage frames 30. This third embodiment therefore no longer has an enclosure 54 defined by a box structure, as in the preceding embodiments. The post 60 arranged in a configuration of the core of the longitudinal member 56 can be added into this same core or be produced in one piece therewith.

Another particular feature of this third embodiment lies at the external longitudinal end 76 of the post 60. This end 76 is no longer attached to the internal surface of the skin 34 but to the external surface thereof, at a swage 104 defining the drilled hole 72 in the skin 34, through which this end 76 passes. In this context, the orifice that is closed off by the closure member 82 is in this case the orifice 74 at the external longitudinal end 76 of the post 60, this end 76 itself being housed in the drilled orifice 72 in the skin 34.

Figure 13:
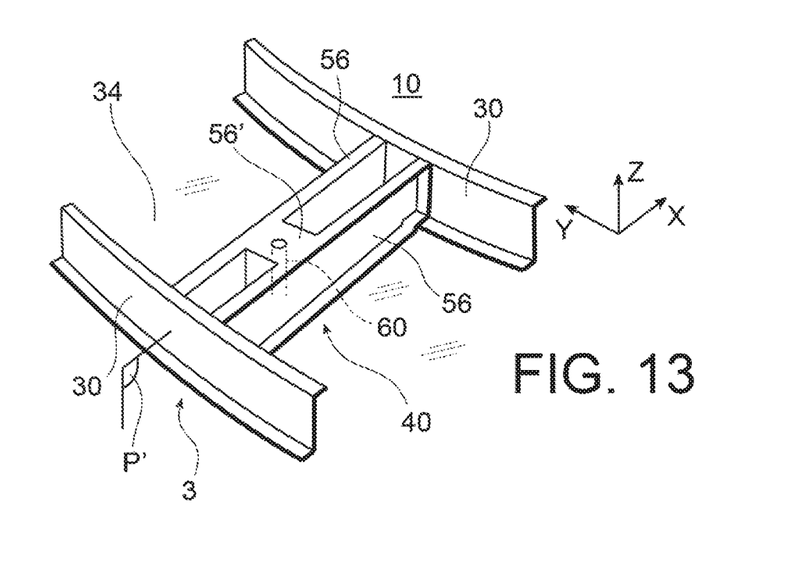
FIG. 13 is a perspective view of an attachment device in accordance with an exemplary embodiment; and, FIG. 14 is a cross section of a part of an attachment system for an internal module, which is applicable to all of the embodiments shown in the preceding figures.

FIG. 13 shows a fourth embodiment, with a design similar to that of the third embodiment. Specifically, the hollow post 60 is now incorporated in a material link 56' establishing the joint between two parallel longitudinal attachment members 56, so as to jointly form a reinforcement with the overall shape of an H.

Figure 14:
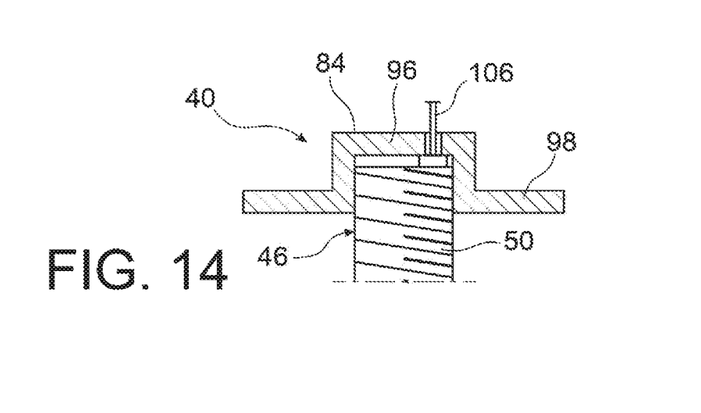

Finally, FIG. 14 shows a possible functionality that is applicable to all of the above-described embodiments. This functionality has the purpose of ensuring that the screw 46 has been screwed correctly into the nut 84 during the attachment of the internal module 8. To this end, the nut 84 has, in the region of its cap 96, an indicator element 106 in the form of a pin that slides in the screwing direction of the screw 46. Thus, the indicator element 106 is provided to be pushed by the end of the attachment shank 50 during screwing, so as to protrude out of the cap 96 once screwing has been completed. This protruding position of the indicator element 106 provides a visual indication for the operator seeking to verify conformity of the attachment. This indication is in this case visual, but it could be electric, or result from a measurement or any other means.

Of course, various modifications can be made by a person skilled in the art to the invention which has just been described, purely by way of non-limiting examples, and the scope of which is defined by the appended claims. In particular, the features of the various embodiments described above can be combined with one another. Generally, it will be recalled that the invention can adopt any embodiment intended to adapt an internal structure of the aircraft so as to incorporate therein a chamber defining external access for the attachment member for the module situated inside the aircraft. An internal structure of the aircraft can be concerned, including the fuselage frames themselves. The adaptation consists in the latter case in reinforcing the internal structure, for example with a bulge, so as to introduce a chamber therein and achieve sufficient structural integrity at the anchoring point of the module. Exemplary embodiments that are envisaged are listed below:

design with a box-structure formed with the aid of two adjacent frames and the fuselage skin;

design with a single or double longitudinal-member arranged between two adjacent frames.

direct incorporation of a post by a local configuration of a frame. The post can be an integral part of the core of the frame or be added thereto.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft part, comprising:
an internal module and a skin provided with at least one stiffener, the internal module being arranged in an internal space of the aircraft part and installed in the internal space with the aid of at least one attachment device, wherein the at least one attachment device comprises:
at least one attachment member comprising an attachment shank and a bearing head;
a chamber for introducing the at least one attachment member from the outside of said internal space, the chamber comprising a first orifice through which the attachment shank passes in the installed configuration of the internal module, and a second orifice which serves for the introduction of the at least one attachment member into the chamber from the outside of the internal space, and
wherein the at least one attachment device also comprises, mounted on the internal module, a complementary attachment member cooperating with the attachment shank of the complementary attachment member.

2. The aircraft part according to claim 1, further comprising a removable closure member closing off the second orifice.

3. The aircraft part according to claim 2, wherein the removeable closure member is mounted by screwing, clip-fastening, or by a quarter-turn connection.

4. The aircraft part according to claim 1, wherein the skin is a fuselage skin, wherein the at least one stiffener is arranged on an internal surface of the skin, in that the second orifice of the chamber serves for the introduction of the at least one attachment member into the chamber from the outside of the fuselage.

5. The aircraft part according to claim 1, wherein the attachment device comprises a hollow post forming the chamber, an internal longitudinal end of the hollow post forming a bearing support for the internal module and being passed through by the first orifice, and an external longitudinal end of the hollow post being attached to the skin, and in that the second orifice is an orifice made through the skin, or an orifice made through the external longitudinal end of the hollow post, when this end is itself housed in an orifice in the skin.

6. The aircraft part according to claim 5, wherein the hollow post is arranged between two immediately consecutive stiffeners of the skin, the hollow post being attached to at least one of the two immediately consecutive stiffeners by way of one or more attachment walls.

7. The aircraft part according to claim 6, wherein the one or more attachment walls comprises at least one longitudinal member attached at its two opposite longitudinal ends to the two immediately consecutive stiffeners.

8. The aircraft part according to claim 6, wherein the one or more attachment walls form with the skin and the two immediately consecutive stiffeners a box structure internally delimiting an enclosure containing at least a part of the hollow post.

9. The aircraft part according to claim 8, wherein the enclosure is pressurized, and in that the one or more attachment device comprises a pressure sealing system arranged between the internal longitudinal end of the hollow post and the internal module.

10. The aircraft part according to claim 1, wherein the at least one attachment device comprises a pressure sealing system arranged in a region of a closure member.

11. The aircraft part according to claim 1, wherein the complementary attachment member is a screw, and the complementary attachment member is a nut, a floating nut or a barrel nut.

12. The aircraft part according to claim 1, wherein the at least one attachment device comprises an indicator element for correct mounting of the at least one attachment member, the indicator element being configured to be pushed by the complementary attachment member while it is being mounted.

13. An aircraft comprising the aircraft part according to claim 1.

14. A method for assembling the internal module of the aircraft part according to claim 1, comprising:
transferring the internal module into the internal space;
introducing the at least one attachment member into the introduction chamber through the second orifice from the outside; and,
mounting the at least one attachment member by introducing the attachment shank through the first orifice.

* * * * *